United States Patent
Fasold et al.

(10) Patent No.: US 9,859,575 B2
(45) Date of Patent: Jan. 2, 2018

(54) HUMIDIFIER, IN PARTICULAR FOR A FUEL CELL

(71) Applicant: MANN+HUMMEL GMBH, Ludwigsburg (DE)

(72) Inventors: Michael Fasold, Auenwald (DE); Thomas Tschech, Marbach (DE); Armando Labarta, Ludwigsburg (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 596 days.

(21) Appl. No.: 14/562,734

(22) Filed: Dec. 7, 2014

(65) Prior Publication Data

US 2015/0162627 A1 Jun. 11, 2015

(30) Foreign Application Priority Data

Dec. 11, 2013 (DE) .......................... 10 2013 020 503

(51) Int. Cl.
*H01M 8/04* (2016.01)
*H01M 8/04119* (2016.01)
*H01M 8/04089* (2016.01)
*H01M 8/1018* (2016.01)

(52) U.S. Cl.
CPC ... *H01M 8/04126* (2013.01); *H01M 8/04149* (2013.01); *H01M 8/04097* (2013.01); *H01M 2008/1095* (2013.01)

(58) Field of Classification Search
CPC ......... H01M 8/04097; H01M 8/04126; H01M 8/04149

USPC ........................................................ 429/413
See application file for complete search history.

(56) References Cited

U.S. PATENT DOCUMENTS

| 5,000,855 A | 3/1991 | Nichols |
| 2006/0112827 A1* | 6/2006 | Okada ................. H01M 8/0273 96/9 |
| 2010/0170833 A1 | 7/2010 | Grzonka et al. |
| 2012/0270120 A1* | 10/2012 | Kim .................. H01M 8/04141 429/413 |
| 2013/0101909 A1 | 4/2013 | Fasold et al. |
| 2014/0106245 A1 | 4/2014 | Harenbrock et al. |
| 2014/0315109 A1 | 10/2014 | Harenbrock et al. |

FOREIGN PATENT DOCUMENTS

| DE | 102012017139 A1 | 3/2014 |
| DE | 102012017142 A1 | 3/2014 |

\* cited by examiner

*Primary Examiner* — Basia Ridley
*Assistant Examiner* — James Erwin
(74) *Attorney, Agent, or Firm* — James Hasselbeck

(57) ABSTRACT

A humidifier is provided with a housing and a stacked unit inserted into the housing that is provided with water vapor-permeable membranes and frame parts, wherein the frame parts are stacked on each other and the water vapor-permeable membranes are arranged between the frame parts, respectively, so that the water vapor-permeable membranes are stacked on top of each other and are spaced apart from each other. The housing has supports that hold the stacked unit. The supports and the frame parts are connected to each other by a connection that is made of laterally projecting connecting tabs and a receiving groove extending in vertical direction, wherein the connecting tabs engage the receiving groove.

14 Claims, 4 Drawing Sheets

HUMIDIFIER, IN PARTICULAR FOR A FUEL CELL

BACKGROUND OF THE INVENTION

The invention concerns a humidifier, in particular for a fuel cell, comprising at least one stacked unit insertable into a housing and comprising several water vapor-permeable membranes which are arranged between frame parts so as to be stacked on top of each other and spaced apart from each other.

EP 1 261 992 B2 discloses a humidifier for a fuel cell that comprises a membrane stack with several membranes arranged on top of each other and spaced apart from each other and between which flow passages are formed. The water vapor-permeable membranes enable transfer of water molecules from humid air, which is passing through a flow passage adjoining a membrane, to a dry air stream in a flow passage extending on the opposite side of the membrane so that the dry air stream is enriched with moisture. The moisturized air stream is supplied to a fuel cell in which electric current is generated in an electrochemical reaction.

One membrane each is framed by two circumferentially extending frame parts stacked on each other, between which the membrane is fastened. The frame parts can be stacked on each other, the stacked unit is inserted into a housing into which the air streams with higher and lower moisture contents are fed.

It is the object of the invention to provide an efficiently operating humidifier of a constructively simply configuration that can be employed, for example, for a fuel cell.

SUMMARY OF THE INVENTION

This object is solved according to the invention in that the housing comprises supports for holding the stacked unit, wherein the connection between the supports and the frame parts arranged on top of each other comprises laterally projecting connecting tabs and a receiving groove extending in vertical direction, wherein the connecting tabs project into the receiving groove.

The dependent claims provide expedient further embodiments.

The humidifier according to the invention can be used for enriching flowing air, that is being fed, for example, to a fuel cell for the electrochemical reaction, with a defined moisture contents. The humidifier comprises a stacked unit of several membranes that are arranged on top of each other, are preferably parallel and spaced apart from each other, and each are water-permeable but not permeable for air, wherein air streams with differently high moisture contents are passed across the opposite membrane sides so that through the membranes a water exchange or water vapor exchange from the air stream with higher moisture content to the air stream with lower moisture content is realized. The stacked unit comprises at least two water vapor-permeable membranes wherein optionally several dozen membranes parallel to each other and spaced apart from each other can be provided. Between two membranes, respectively, a flow path or flow passage is formed through which an air stream is guided through the stacked unit parallel to the membrane plane. The inflow of the two air streams with differently high moisture contents into the stacked unit is, for example, realized in cross-flow.

The water vapor-permeable membranes are arranged between frame parts on top of each other wherein the frame parts are stacked on each other and in this way form the stacked unit which can be inserted into a housing. The housing comprises lateral supports which serve for securing the stacked unit. Usually, in the housing, four supports are provided in the corners of the housing in case of a rectangular basic shape wherein, in principle, also a deviating number of supports in the housing is possible.

The connection between the supports and the frame parts that are arranged on top of each other in the stacked unit is realized by means of a receiving groove into which a connecting tab is projecting. In this way, a form-fit connection between the stacked unit and the housing is provided which can be produced simply by insertion of the stacked unit into the housing. The stacked unit is preferably inserted from above into the housing; in doing so, at the same time, the projecting connecting tabs engage the receiving groove wherein, during the insertion process in vertical direction, the connecting tabs and the receiving groove perform a relative movement relative to each other until the final mounted position of the stacked unit in the housing is reached.

The connection by means of the connecting tabs and the receiving groove has moreover a flow-separating function. The flow passages on the different sides of the membrane are flowed through by the air streams with differently high moisture contents, wherein at the inflow and at the outflow side care must be taken that no mixing of the different air streams by means of a bypass circumventing the respective flow passages on the exterior side of the stacked unit takes place. Preventing this is one of the functions of the connection via the connecting tabs and the receiving grooves between the supports and the frame parts arranged on top of each other. In order to improve the flow-tight separation, it can be expedient in this context to provide an additional sealing element which extends in the vertical direction across the height of the stacked unit.

According to an advantageous embodiment, the receiving groove is introduced into a support of the housing and the connecting tabs are located on the frame parts. In this context, the open side of the receiving groove faces inwardly in the direction of the housing interior and the connecting tabs at the frame parts project laterally outwardly. In principle, a reverse configuration is possible also in which the receiving groove is located within the frame parts with the open side of the groove facing outwardly and the connecting tabs are arranged on the supports and project inwardly.

Advantageously, each support of the housing serves for connecting with the stacked unit by means of the receiving grooves and the connecting tabs. Between two supports, the housing can be of an open configuration for inflow and outflow of the air streams with different moisture contents. Possible is also a closed configuration but with appropriate flow guidance for supply and discharge of the air streams.

According to a preferred embodiment, the connection between the connecting tabs and the receiving groove has correlated therewith at least one sealing element that extends across the height of the stacked unit in order to ensure a flow-tight separation between the different outer sides of the stacked unit which adjoin the respective supports. The sealing element can be integrated into the receiving groove wherein optionally, in addition or as an alternative, also an arrangement of the sealing element outside of the receiving groove but immediately adjacent between the engagement of the connecting tabs in the receiving groove is possible.

In case of an integration of the sealing element in the receiving groove, according to a further advantageous embodiment, sealing material or sealing compound in liquid state can be filled into the receiving groove and subsequently cure within the receiving groove for generating the sealing element. This process is advantageously performed after the stacked unit has been inserted into the housing and the connecting tabs project into the receiving groove. After curing of the sealing material, the latter fills out the receiving groove completely and enhances the flow-tight separation. In the liquid state, the sealing material can moreover penetrate into gaps or cavities, which, for example, are formed between connecting tabs arranged on top of each other at the stacked frame parts, and can cure therein. In case of an arrangement of the connecting tabs in the rim area of the frame parts between which the membranes are clamped, a plurality of such connecting tabs are provided across the height of the stacked unit and between them a gap may be located possibly, as a result of tolerances, that is then filled by the liquid sealing material.

According to a further advantageous embodiment, the stacked unit has an upper end plate and a lower end plate wherein the lower end plate in the inserted state is positioned neighboring the bottom of the housing and the upper end plate is positioned neighboring the cover that can be placed onto the housing. In order to prevent a bypass of the respectively fed-in air stream through the space between the bottom of the housing and the lower end plate, on the one hand, or the upper end plate and the inner cover side, on the other hand, sealing elements can be arranged between bottom and lower end plate or upper end plate and cover of the housing which prevent flow through in at least one direction, optionally in both directions. The sealing elements can be introduced into the bottom or the cover wherein also an embodiment with an arrangement of the sealing elements at the end plates or a combination of sealing elements at the bottom or cover and at the end plates is possible. The sealing elements extend, for example, in a crossed arrangement or are embodied circumferentially in order to achieve the desired flow blocking action for both air streams. In this way, it is ensured that both air streams are guided completely and without loss across the membranes of the stacked unit and participate in the moisture exchange.

Optionally, a sealing element is introduced into a sealing groove that is, for example, introduced into the bottom or the cover. The sealing groove can be connected with the receiving groove or can adjoin the receiving groove.

BRIEF DESCRIPTION OF THE DRAWINGS

Further advantages and expedient embodiments can be taken from the further claims, the Figure description, and the drawings.

In the Figures, same components are provided with same reference characters.

DESCRIPTION OF PREFERRED EMBODIMENTS

Figure 1:
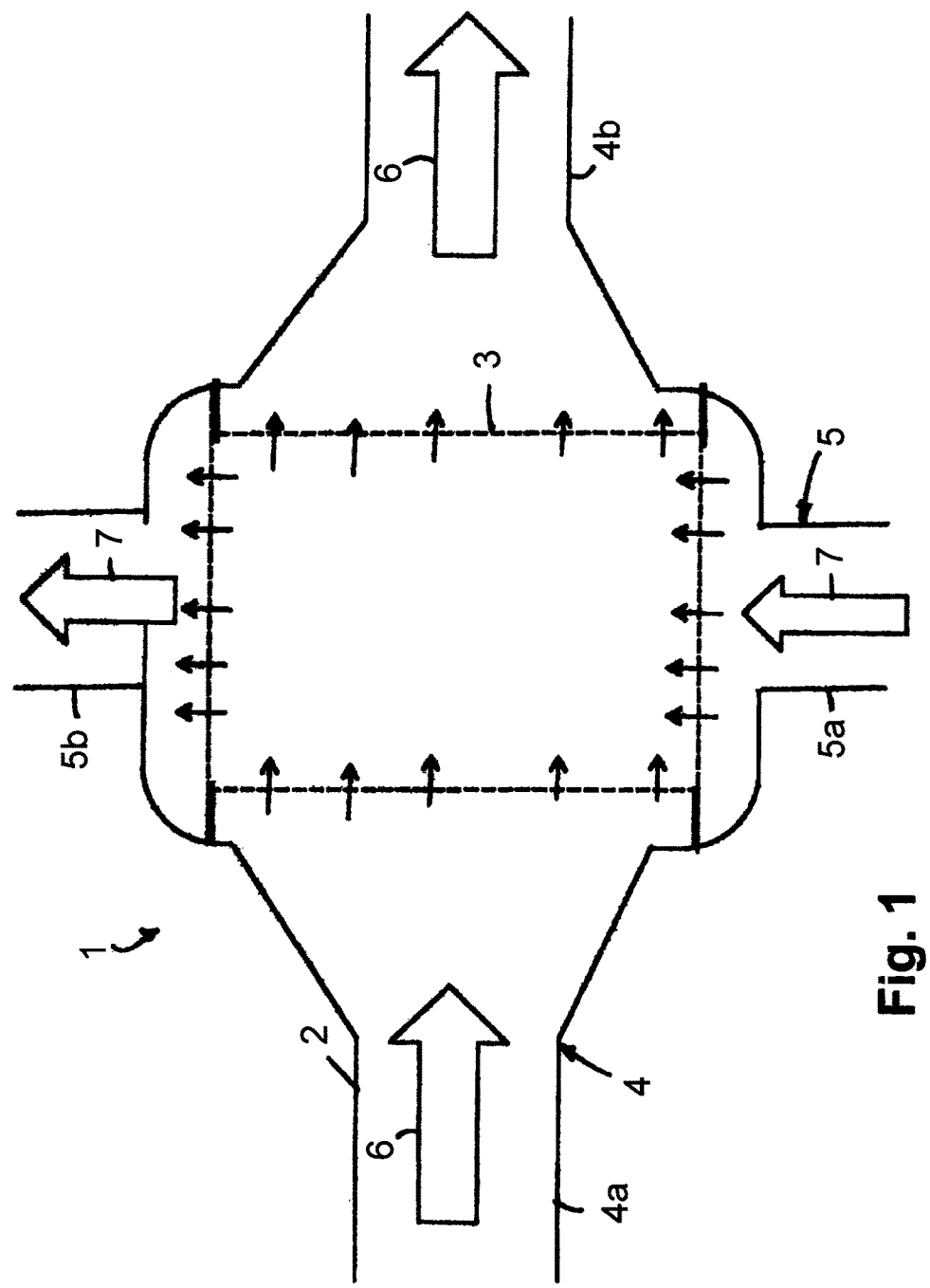
FIG. 1 shows a humidifier for a fuel cell with a cartridge inserted into a housing, the cartridge comprising several water vapor-permeable membranes that are arranged parallel on top of each other and form a stacked unit.

In FIG. 1, a humidifier 1 for a fuel cell is illustrated by means of which the fuel cell is supplied with fresh air that is enriched with moisture and contains a minimum moisture. The humidifier 1 comprises in a housing 2 an exchangeably inserted cartridge 3 which serves to transfer the moisture contained in an exhaust stream onto a dry fresh air stream supplied to the fuel cell. The cartridge 3 comprises a stacked unit with a plurality of water vapor-permeable membranes 8 that are stacked on top of each other.

The housing 2 of the humidifier 1 is provided with a fresh air channel 4 by means of which ambient air is fed in as fresh air. The fresh air channel 4 comprises a supply section 4a upstream of the cartridge 3 as well as a discharge section 4b downstream of the cartridge 3.

At an angle of 90° displaced relative to the fresh air channel 4, the housing 2 is provided with an exhaust gas channel 5 by means of which exhaust gases of the fuel cell which are enriched with moisture are passed through the cartridge 3. The exhaust gas channel 5 has a supply section 5a upstream of the cartridge 3 and a discharge section 5b downstream of the cartridge 3.

The fresh air stream 6 and the exhaust gas stream 7 cross at an angle of 90° in accordance with the orientation of the chancels 4 and 5 but the air streams 6 and 7 are separated within the cartridge 3 by the water vapor-permeable membranes 8 which only enable a water exchange from the exhaust gas stream 7 laden with a high moisture content onto the dry fresh air stream 6.

Figure 2:
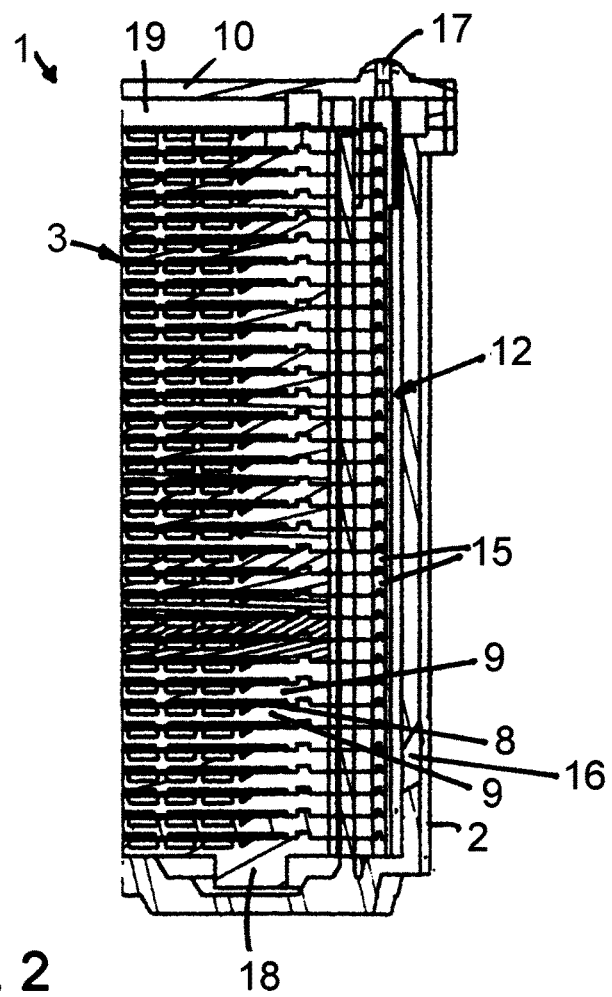
FIG. 2 is a section view in longitudinal direction through the humidifier.
Figure 3:
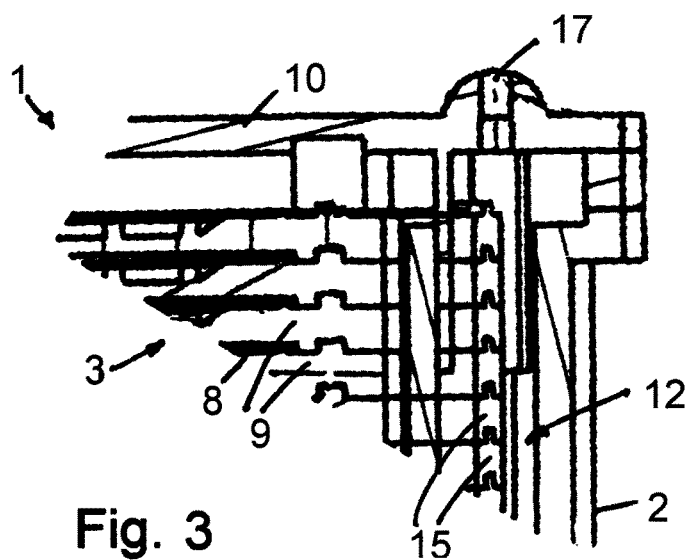
FIG. 3 shows a detail of the transition between housing and cover in an enlarged illustration.

In FIGS. 2 and 3, a longitudinal section of the humidifier 1 is illustrated. The cartridge 3 with the stacked unit which comprises a plurality of membranes 8 that are positioned on top of each other between frame parts 9 is inserted into the housing 2. Each membrane 8 is framed and clamped in the rim area by the frame parts 9 positioned above and below, respectively. The frame parts 9 are stacked on each other and form as a whole together with the membranes 8 the stacked unit of the cartridge 3. The housing 2 can be closed by a cover 10.

Figure 4:
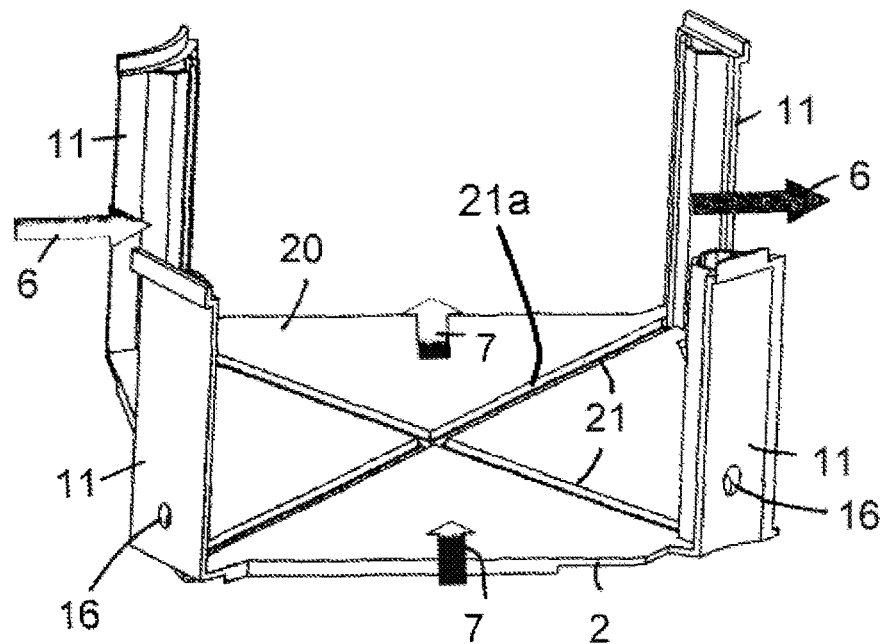
FIG. 4 shows in perspective view the housing of the humidifier.

As can be seen in FIGS. 2 and 3 in connection with the other Figures, the housing 2, like the stacked unit, has a rectangular basic shape and comprises in each corner area a support 11 on which the inserted stacked unit is secured. Between neighboring supports 11, respectively, the air streams 6 and 7, as is shown in FIG. 4, can pass through the housing 2 with the inserted stacked unit.

Figure 7:
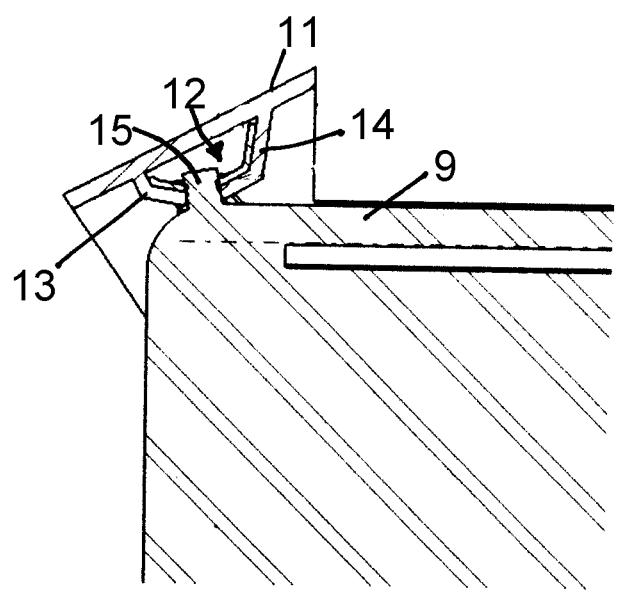
FIG. 7 shows in an enlarged illustration the engagement of a laterally projecting connecting tab at the stacked unit in a receiving groove which is introduced into a support of the housing.

In each support 11, a receiving groove 12 is introduced that extends across the entire height of the support 11. The receiving groove 12 has a C-shaped cross-section perpendicular to the vertical direction wherein two legs 13 and 14 (FIG. 7) which are integrally formed on the support 11 delimit the receiving groove 12 and, at the same time, enclose a receiving space extending across the axial height in the receiving groove 12. A connecting tab 15 is projecting into the receiving groove 12 and is formed monolithically with the frame part 9. On each frame part 9 a connecting tab 15 is formed wherein the connecting tabs 15 that are positioned on top of each other form a vertical web which extends across the height of the stacked unit in the vertical direction. The connecting tabs 15 project laterally transversely from the frame parts 9 in outward direction and can be inserted into the receiving groove 12 by vertical insertion of the stacked unit into the housing 2. The size of the cross-section of the receiving groove 12 is greater than the size of the cross-section of the connecting tabs 15 perpendicular to the vertical direction. The connection between the vertically continuous web of the connecting tabs 15 and the supports 11 flow-tightly separates the various outer sides of the stacked unit from each other so that the air streams which are guided crosswise through the stacked unit are also separated from each other and no undesirable mixing by bypassing the membranes can take place.

For improving the sealing action, a liquid sealing compound or a liquid sealing material can be filled into the receiving groove 12 after the stacked unit has been inserted into the housing 2 and the connecting tabs 15 project into the receiving groove 12. Filling in the liquid sealing material is realized through a fill opening 16 (FIGS. 2, 4) which is introduced into the exterior side of the supports 11 and which is connected with the interior of the receiving groove 12. Filling in the liquid sealing material is realized after insertion of the stacked unit and closing the cover 10 into which a venting opening 17 (FIGS. 2, 3) is provided through which upon filling in the sealing material air can escape from the receiving groove 12. The liquid sealing material fills the receiving groove 12 completely and encloses the projecting part of the connecting tabs 15. Also, liquid sealing material can penetrate into gaps between the stacked connecting tabs 15 so that a further improvement of the sealing action is achieved.

Figure 5:
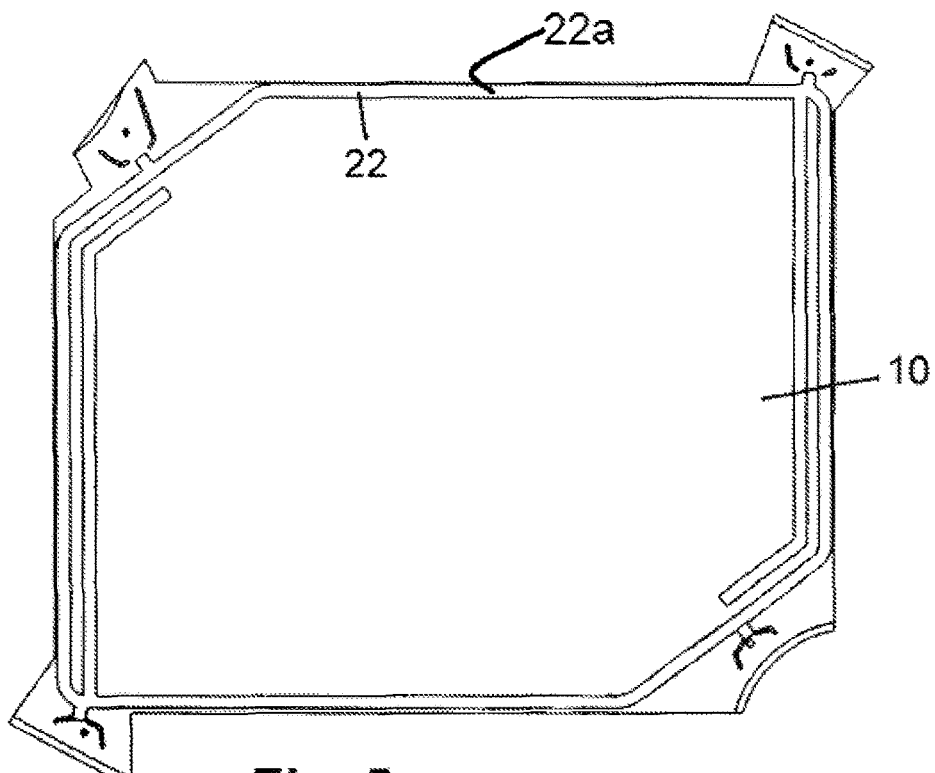
FIG. 5 is a view of the inner cover side of the cover for the housing.
Figure 6:
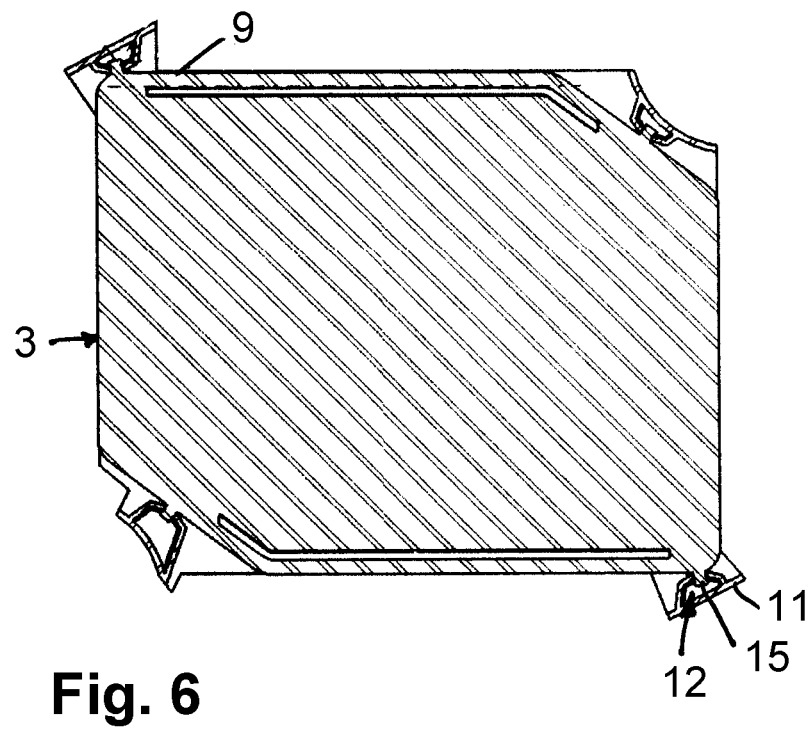
FIG. 6 shows a horizontal section view through the humidifier.

The stacked unit is covered at its lower and upper end face by an end plate 18, 19, respectively, which extends across the cross-sectional surface of the stacked unit. In order to avoid a bypass in a space between the bottom 20 of the housing 2 and the lower end plate 18, on the one hand, and a space between the upper end plate 19 and the inner side of the cover 10, on the other hand, a cross-wise extending sealing element 21 (FIG. 4) is introduced into the bottom and a circumferentially extending sealing element 22 (FIG. 5) is provided on the inner cover side of the cover 10. The sealing elements 21 and 22 prevent that a portion of the fed-in air streams 6 or 7 is guided across the outer side of the respective end plate 18, 19 by bypassing the flow passages extending immediately adjacent to the membranes. The sealing elements 21, 22 flow-tightly seal the space between the bottom 20 and the lower end plate 18 or the space between the upper end plate 19 and the inner side of the cover 10 in both flow directions. The cross-wise extending sealing element 21 may be received into or mounted into a sealing groove 21a which may be formed into or introduced into the bottom 20 (FIG. 4). The circumferentially extending sealing element 22 (FIG. 5) may be received into or mounted into a receiving groove 22a which may be formed into or introduced into the inner cover side of the cover 10.

While specific embodiments of the invention have been shown and described in detail to illustrate the inventive principles, it will be understood that the invention may be embodied otherwise without departing from such principles.

What is claimed is:

1. A humidifier comprising:
   a housing;
   a stacked unit inserted into the housing and comprising water vapor-permeable membranes and further comprising frame parts, wherein the frame parts are stacked on each other and the water vapor-permeable membranes are arranged between the frame parts, respectively, so that the water vapor-permeable membranes are stacked on top of each other and spaced apart from each other;
   the housing comprising supports configured to hold the stacked unit;
   wherein the supports and the frame parts are connected to each other by a connection, the connection comprising laterally projecting connecting tabs and a receiving groove extending in a vertical direction, wherein the connecting tabs engage the receiving groove.

2. The humidifier according to claim 1, wherein the receiving groove is provided on one of the supports, respectively, and the connecting tabs are arranged on the frame parts.

3. The humidifier according to claim 2, wherein the connecting tabs engaging the receiving groove form a vertical web.

4. The humidifier according to claim 1, wherein the receiving groove has a cross-section in a direction perpendicular to the vertical direction and the connecting tabs have a cross-section in the direction perpendicular to the vertical direction, wherein a size of the cross-section of the receiving groove is greater than a size of the cross-section of the connecting tabs.

5. The humidifier according to claim 1, further comprising a sealing element extending along the connection between the supports and the frame parts.

6. The humidifier according to claim 5, wherein the sealing element is introduced into the receiving groove.

7. The humidifier according to claim 6, wherein the sealing element is a cured liquid sealing material filled into the receiving groove.

8. The humidifier according to claim 1, wherein the housing comprises a bottom and a cover, wherein the stacked unit comprises an upper end plate and a lower end plate, wherein the upper end plate is positioned adjacent to the cover and the lower end plate is positioned adjacent to the bottom, wherein at least one sealing element is arranged between the bottom and the lower end plate; between the cover and the upper end plate; or between the bottom and the lower end plate and between the cover and the upper end plate so as to prevent flow through in at least one flow direction.

9. The humidifier according to claim 8, wherein the at least one sealing element is arranged in a crossed arrangement.

10. The humidifier according to claim 8, wherein the at least one sealing element is a circumferentially extending sealing element.

11. The humidifier according to claim 8, wherein the at least one sealing element is arranged on the bottom or on the cover.

12. The humidifier according to claim 8, wherein the at least one sealing element is inserted into a sealing groove.

13. The humidifier according to claim 12, wherein the sealing groove is connected to the receiving groove.

14. A fuel cell comprising a humidifier according to claim 1.

* * * * *